(12) United States Patent
Brandel et al.

(10) Patent No.: US 11,374,948 B2
(45) Date of Patent: Jun. 28, 2022

(54) COMPUTER SECURITY SYSTEM WITH NETWORK TRAFFIC ANALYSIS

(71) Applicant: Target Brands, Inc., Minneapolis, MN (US)

(72) Inventors: Eric Brandel, Minneapolis, MN (US); Chris Carlson, Minneapolis, MN (US); Paul Melson, Minneapolis, MN (US); Caleb Walch, Minneapolis, MN (US); Adam Lesperance, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 306 days.

(21) Appl. No.: 16/752,120

(22) Filed: Jan. 24, 2020

(65) Prior Publication Data
US 2020/0244680 A1 Jul. 30, 2020

Related U.S. Application Data

(60) Provisional application No. 62/796,995, filed on Jan. 25, 2019.

(51) Int. Cl.
*H04L 9/40* (2022.01)
*G06F 9/54* (2006.01)
(Continued)

(52) U.S. Cl.
CPC .......... *H04L 63/1416* (2013.01); *G06F 9/542* (2013.01); *G06F 9/544* (2013.01);
(Continued)

(58) Field of Classification Search
CPC . H04L 63/1416; H04L 41/22; H04L 63/1425; H04L 63/1433; H04L 63/145;
(Continued)

(56) References Cited

U.S. PATENT DOCUMENTS 8,176,527 B1 5/2012 Njemanze et al.
9,813,435 B2 11/2017 Muddu et al.
(Continued)

OTHER PUBLICATIONS

Uddin et al., "Signature-based Multi-Layer Distributed Intrusion Detection System using Mobile Agents" IJ Network Security, Jan. 2013, 15(2):97-105.

*Primary Examiner* — Cheng-Feng Huang
(74) *Attorney, Agent, or Firm* — Fish & Richardson P.C.

(57) ABSTRACT

A plurality of network sensors are configured to sense the operations of a data network and, responsive to sensing the operations of the data network, generate event data objects that record the operations of the data network. One or more decorator pipelines are configured to decorate the event data objects with data other than from operations of the data network. A security frontend is configured to generate a graphical user interface (GUI) configured to provide, to a user, query-authoring tools, receiving a query in a structured language, provide responsive to receiving the query, results to the query from historic event data that was decorated before the query was received, receive approval for the query, and later execute the query on new event data that has been decorated after the approval for the query is received.

18 Claims, 9 Drawing Sheets

(51) Int. Cl.
  *G06F 16/245*   (2019.01)
  *G06F 16/242*   (2019.01)
  *G06F 16/22*    (2019.01)
  *H04L 41/22*    (2022.01)

(52) U.S. Cl.
  CPC ............ *G06F 16/22* (2019.01); *G06F 16/244* (2019.01); *G06F 16/245* (2019.01); *H04L 41/22* (2013.01); *H04L 63/145* (2013.01); *H04L 63/1425* (2013.01); *H04L 63/1433* (2013.01); *H04L 63/20* (2013.01)

(58) Field of Classification Search
  CPC ..... H04L 63/20; H04L 63/1408; G06F 9/542; G06F 9/544; G06F 16/22; G06F 16/244; G06F 16/245; G06F 21/554
  See application file for complete search history.

(56) References Cited

U.S. PATENT DOCUMENTS

| | | |
|---|---|---|
| 2003/0188189 A1 | 10/2003 | Desai et al. |
| 2005/0132046 A1* | 6/2005 | de la Iglesia ....... H04L 63/1425 709/225 |
| 2010/0011410 A1* | 1/2010 | Liu .................. H04L 63/20 726/1 |
| 2010/0153316 A1 | 6/2010 | Duffield et al. |
| 2013/0246431 A1* | 9/2013 | Ahuja .................. H04L 63/20 707/E17.089 |
| 2017/0366582 A1* | 12/2017 | Kothekar .............. H04L 63/101 |
| 2019/0036958 A1* | 1/2019 | Shi .................... H04L 63/1433 |
| 2019/0190936 A1* | 6/2019 | Thomas ................ H04L 43/10 |
| 2019/0207966 A1* | 7/2019 | Vashisht ............. H04L 63/1416 |

\* cited by examiner

FIG. 4B ical field

COMPUTER SECURITY SYSTEM WITH NETWORK TRAFFIC ANALYSIS

CROSS-REFERENCE TO RELATED APPLICATIONS

This application claims the benefit of U.S. Provisional Application Ser. No. 62/796,995, filed Jan. 25, 2019. The disclosure of the prior application is considered part of (and is incorporated by reference in) the disclosure of this application.

TECHNICAL FIELD

The present document generally relates to computer network security, such as monitoring for and identifying potentially malicious network traffic.

BACKGROUND

Network security includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme.

Network security can include proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

This document generally describes computer systems, processes, program products, and devices for the rapid and automated collection, storage, and analysis of network events to provide improved and enhanced security analysis. The system can include an extensible framework for pipelines to generate, normalize, and decorate network events created in response to network activity, which can permit the system to readily scale up and down to handle large volumes and variations in network activity. For example, the capacity of such pipelines can ramp up when load is increased in order to handle heavy network activity, and then more slowly ramp down when load decreases. The system framework can additionally store and analyze large volumes of network activity, such as by continually running stored queries across the stored network activity, which can provide a historical log permitting network activity to be analyzed in context of its places in serial network activity (as opposed to analyzing each network activity in isolation). The queries can be readily created, uploaded, and edited by users, such as security analysts, who can design queries in easily readable and editable formats (e.g., regex queries) that can be automatically converted to appropriate query formats at runtime.

In one aspect, a system is used for the generation and analysis of event data related to the operation of a data network. The system includes a plurality of network sensors configured to sense the operations of the data network and, responsive to sensing the operations of the data network, generate event data objects that record the operations of the data network. The system further includes one or more decorator pipelines configured to decorate the event data objects with data other than from operations of the data network. The system further includes a security frontend configured to generate a graphical user interface (GUI) configured to provide, to a user, query-authoring tools, receiving a query in a structured language, provide responsive to receiving the query, results to the query from historic event data that was decorated before the query was received, receive approval for the query, and later execute the query on new event data that has been decorated after the approval for the query is received. Other systems, method, device, and computer-readable medium may be used.

Implementations can include any, all, or none of the following features. The system further includes an aggregator datastore configured to store the event data objects after the event data objects have been decorated. The aggregator datastore, in order to store the event data objects after the event data objects have been decorated, is configured to store the event data objects after the event data objects have been decorated in a rolling buffer in which old data is removed to make room for new data. The aggregator datastore is further configured to generate a search index that indexes only a predetermined amount of the newest event data stored in the aggregator datastore. Later executing the query on new event data that has been decorated after the approval for the query is received includes use of the search index. Generation of the search index and storage of the event data objects after the event data objects have been decorated occur concurrently and continuously. To later execute the query on new event data that has been decorated after the approval for the query is received, the security frontend is further configured to transmit an alert specifying the result of the later execution.

The systems, devices, program products, and processes described throughout this document can, in some instances, provide one or more of the following advantages. By performing decoration of network events at the time of ingestion, instead of later after the events are ingested, processing efficiencies may be realized that allow for large-scale and fine-grain data collection of network activity using less hardware resources than would be otherwise required. This also allows for faster detection because identification may be based on a one-to-one match, which can improve performance and efficiency later in the system. For example, as a single event moves through the system, relevant characteristics are directly appending to the event and are presented at the end as a single atomic package. The stored network events can be kept in a rolling buffer for access when investigating recent network events for possible intrusion, for testing new queries to be used as rules, etc. To allow for more efficient searching of these events, a regularly updating index that provides search indexing can be maintained on the most recent (e.g., 1 day, 1 hour) events. Query-defined rules may be run on these newest events using the index, and alerts about possible security issues may be generated and distributed.

Other features, aspects and potential advantages will be apparent from the accompanying description and figures.

DESCRIPTION OF DRAWINGS

FIGS. 4B and 4C are example of graphical user interfaces (GUIs) used in the example process of 4A.

Like reference symbols in the various drawings indicate like elements

DETAILED DESCRIPTION

Figure 1A:
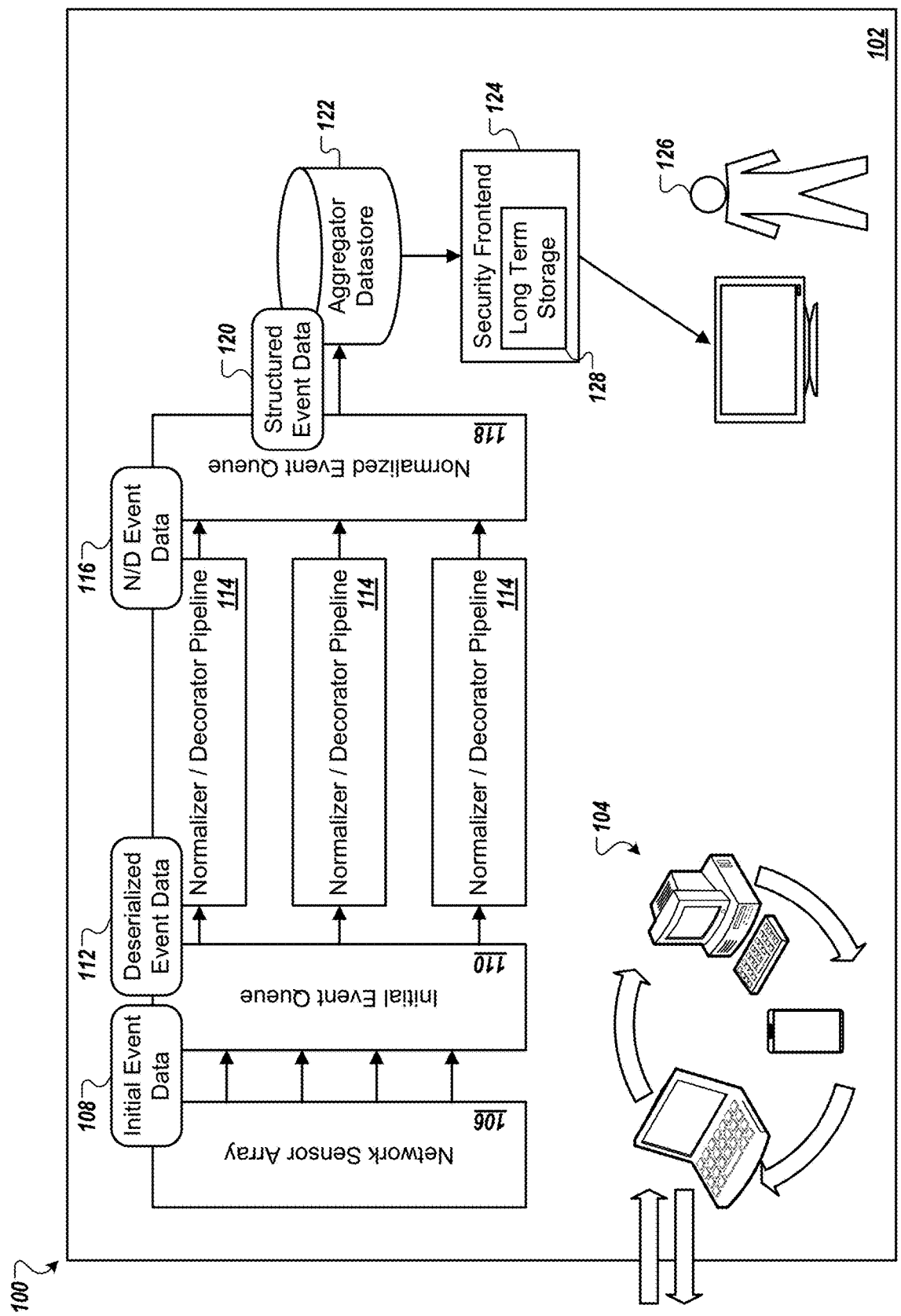
FIGS. 1A and 1B are block diagrams of an example system for generating events in response to network activity.

An event pipeline can be created to create and store events generated based on network and system activity. A network sensor array can generate event data, and the events can be serialized and provided to a flexible number of pipelines that each normalize and decorate the events so that the events comply with a universal set of formatting requirements and so that the events include data related to the events and useful for security analysis. These events can be deserialized and stored in an aggregator datastore. A security frontend can provide a user with a GUI with which the user can analyze the events, set rules to be run on incoming data, etc.

Using this architecture, a modern and very large-scale network can be monitored. This architecture can scale efficiently with the size of the network, providing real-time or near-real-time information to interested parties about events that occur within the network. In some implementations, events can be observed, documented, and tested with security rules in time-windows of seconds or a few minutes. This can allow for rapid detection and mitigation of security threats even in a large, geographically and logically diverse network.

One feature that contributes to scalability of the system is elements of the system that are configured to be more sensitive to scaling up and less sensitive to scaling down. For example, data-management pipelines in systems described here can be configured so that they are very fast to respond to growth in backlogs of data, but very slow to respond to reductions in backlogs. The system can use a variable number of pipelines based on conditions. In one example, when a queue of data waiting to be processed by one of the pipeline grows (e.g., more data than a threshold value, a trend of increased time or data) the system can respond by generating many additional pipelines at once. Then, when the backlog shrinks (e.g., data falling below a threshold value, a trend of data decreasing) the system can respond by removing only, for example, one pipeline.

One feature that contributes to scalability of the system is to store event data in a datastore, and to continuously run security tests only on the newest event data. For example, the systems can store event data in a rolling buffer that maintains event data for the last two weeks. To identify malicious attacks on the network, the system may run queries on the stored event data in order to identify event data that is indicative of malicious activity. Running these queries on all of the data in the datastore can be avoided by the system, which can be configured to run the queries only on the newest data (e.g., from the last five minutes, from the last hour.) In order to execute these queries very quickly, the system can maintain large, detailed search indexes only on this newest data (e.g., from the last five minutes, from the last hour.) In this way, the queries can be run more quickly, and thus more often, which can allow for full coverage even if the amount of event data is very large and is generated very quickly.

Large, complex networks face many security concerns and attacks, and those attacks and concerns are constantly evolving as malicious attackers continue to develop new and more advanced attack protocols. As such, tools that allow a security analyst to quickly develop, test, and install the rules to be run on the newest data allow the work of the security analyst to scale well as the size and complexity of the network increases. Systems described in this document can provide a security analyst with tools that allow for this quick development, testing, and installation. An interface allows a security analyst to author new queries, which can be run on the history query data that is in the rolling buffer of recent event data. This allows the security analyst to use their human intellect and information about attack protocols to develop and test new queries designed to capture indications of attacks in the historic event data.

Once the security analyst is satisfied with a query, the query can be saved, without alteration, by the system. This saved query can then be added to the list of tests that are run on future incoming data in order to automatically spot patterns in the events that are indicative of an attack on the network.

FIG. 1A is a block diagram of an example system 100 for generating events in response to network activity. In the system 100, a network 102 is being protected by one or more security analysts. The security analysts are users that are tasked with monitoring the security state of the network 102 and to prevent malicious activity like malware execution, data exfiltration, etc.

The network 102 is, for example, a local network, intranet, virtual private network, or other data network used by an organization. The network 102 can include networking hardware such as cables, wireless access points, routers, gateways, firewalls, etc., that work together to allow resident machines 104 to communicate with other resident machines 104 and with computing resources outside of the network 102. The resident machines 104 can include, but are not limited to, personal computers, servers, and mobile devices.

Operations of the network 102 and resident machines 104 may come under attack from malicious actors—users and/or automated services that seek to exploit computing resources they do not own or have authorization to use. The system 100 can be configured to provide monitoring functionality that generates data based on the activity on the network—including malicious activity. This monitoring can then be provided to a security analyst that is tasked with stopping or attempt to stop these attacks through various types of security responses.

When the resident machines 104 participate in data transmission on the network 102, an array of network security sensors 106 can sense the network activity and generate data for one or more events that represent the activity. For example, the sensors 106 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 106. Depending on the size and scale of the network 102, one array of network sensors 106 may have more or fewer sensors than another array of network sensors. In various examples, hundreds, thousands, tens of thousands, or hundreds of thousands of sensors can be used, although more or fewer are possible. In addition or in the alternative, the sensors 106 can also record non-network activity. For example, when devices hosted on the network perform sensitive operations (e.g., accessing a sensitive data repository, executing applications, the sensors 106 can sense these activities.

The sensors can provide the initial event data 108 to one or more initial event queues 110. The initial event data 108 may include data objects that do not conform to any single format or structure, may be out of chronological order, and may otherwise be non-homogeneous. The initial event queues 110 can receive the initial event data 108 and deserialize the data objects of the initial event data 108 into deserialized event data 112. The deserialized event data can include all or part of the data included in the initial event data 108, and has been deserialized. In general, serialization of data involves the transforming or reconfiguring of data so that it can be stored, transmitted, etc. For example, the serialization process performed by the initial event queues 110 can include padding out short data strings or removing redundant data, decompressing compressed data, changing the format, etc.

One or more normalizer/decorator pipelines 114 can receive the deserialized event data 112 from the initial event queues 110 and process the deserialized event data 112 into normalized/decorated event data 116. For example, the normalizer/decorator pipelines 114 can normalize the deserialized event data 112 by editing its structure so that the structure complies with one or more standards, and the normalizer/decorator pipelines 114 can decorate the deserialized event data 112 by adding data to the events from other sources (e.g., timestamps, geo-location data, threat intelligence data, a connection-identifier.)

The number of normalizer/decorator pipelines 114 can change depending on the load of the initial event queues 110. For example, new instances of normalizer/decorator pipelines 114 can be generated and used when a backlog of deserialized event data 112 is prepared by the initial event queue 110, and these normalizer/decorator pipelines 114 can be released and idle when the backlog falls under a threshold size, is empty, begins trending downward, etc.

In some cases, the ramp-up of the normalizer/decorator pipelines 114 can be more sensitive than the ramp-down. That is, a particular growth in backlog may cause more normalizer/decorator pipelines 114 to be instantiated faster than a similar reduction in backlog. This may be accomplished, for example, by adding N normalizer/decorator pipelines 114 every time-unit (e.g., second, 30 seconds, minute, hour) a backlog over a certain size is seen, and removing only M normalizer/decorator pipelines 114 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The system 100 can be configured to use the normalizer/decorator pipeline 114 to efficiently make matches and append flags to data. One such type of flag is an Indicator of Compromise (IoC) that records information a compromise. IoC can generally include single pieces of information that can be quickly examined and flagged. By using simple, single data matching, fewer computational resources may be required compared to more complex matching. By appending the IoC with the normalizer/decorator pipeline 114, later elements such as the security frontend 124 may be executed with less resources than would otherwise be needed. For example, the normalizer/decorator pipeline 114 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator datastore 122 can collect the structured event data 120 and store the structured event data 120 in an indexable and searchable datastore 122. The aggregator datastore 122 may store all of the structured event data 120 until the aggregator datastore 122 is full or otherwise storing at least a threshold amount of data or data older than a threshold period of time. When this volume or age of data is reached, the oldest data may be discarded, making room for new data. That is, the aggregator datastore 122 may operate as a rolling buffer that provides storage for the new data, discarding the old data. Other storage systems (not shown here for clarity) can be used for long-term or archival storage, which may provide less expensive storage that is slower to respond to queries.

A security front-end 124 can provide a graphical user interface (GUI) to a computer and/or other devices used by a security analyst 126. The GUI can provide the security analyst 126 with access to the structured event data 120 that is stored in the aggregator datastore 122 in a way that allows the security analyst 126 to understand and more quickly investigate security events of the network 102 that may or may not be malicious. For example, the GUI can provide the security analyst 126 with tools to draft queries, test the queries on the structured event data 120, and then store the same query for use as a rule on future events that are collected from the network 102.

In addition, the security frontend 124 can execute one or more rules on the incoming structured event data 120. These rules may contain conditional statements that, if ever found true on incoming event data, trigger response statements. These response statements can include instructions for automated responses (e.g., quarantining a device on the network 102, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the system 100 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipeline 114 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with this system 100. In one example, an enterprise data network that connects hundreds of physical locations and millions of devices can be effectively and efficiently monitored. In this example, tens of thousands sensors 106 can produce tens of trillions of events a day (including hundreds of thousands or millions of events a second). The system 100 can be created using hardware resources that may be well within an enterprise of this size and scope, and provide access to events in the aggregator datastore 122 within seconds of the event occurring on the network. Further, the rules may be run on the events every minute or every handful of minutes.

Further, the use of a rolling buffer in the aggregator datastore 122 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

Figure 1B:
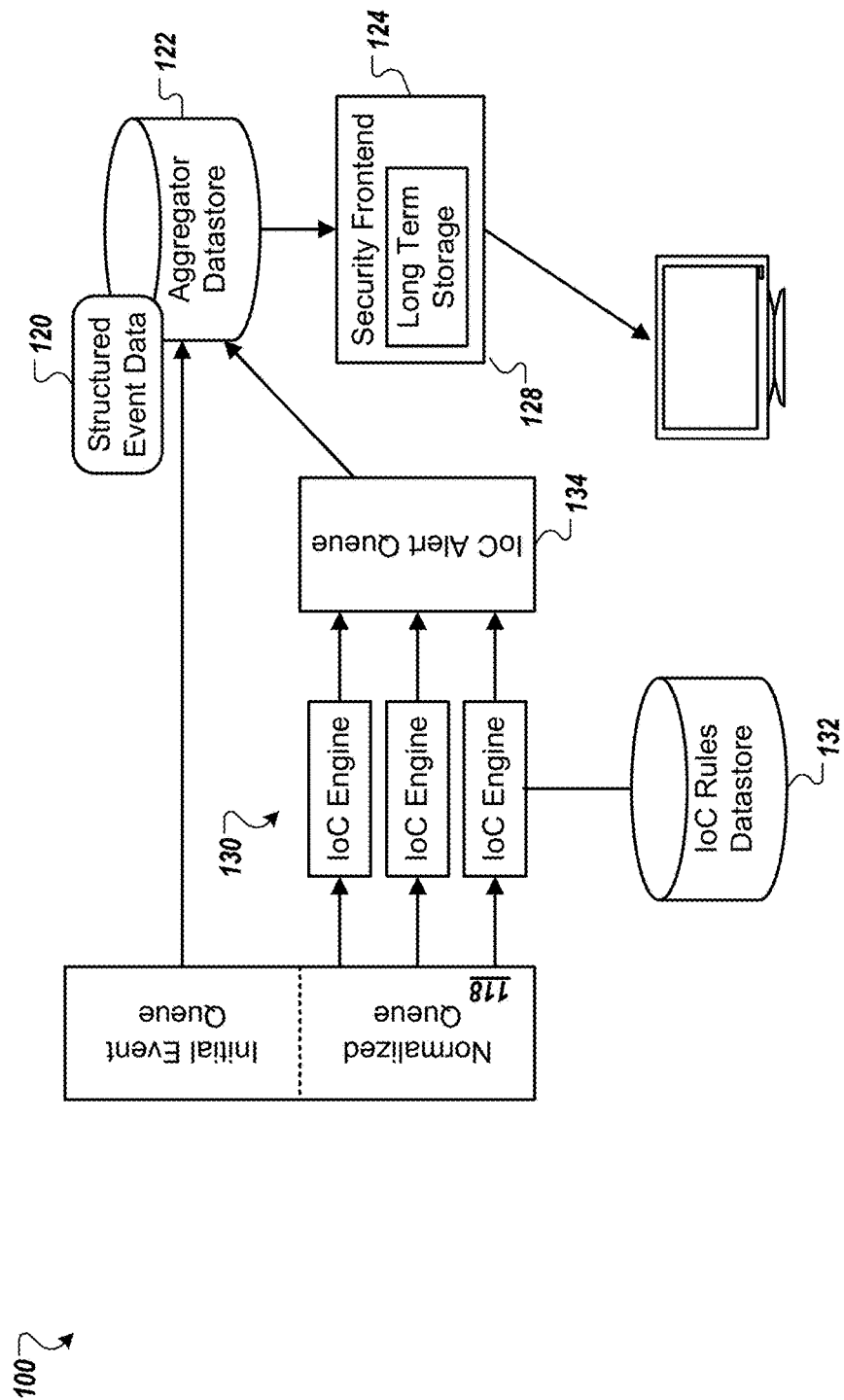

FIG. 1B is a block diagram of optional elements of the system 100. As shown here, the normalized event queue 118 can include one or more normalized queues from which network event data can be provided to the IoC engines 130 for processing against IoC rules. The IoC engines 130 can receive network event data, either structured or unstructured, along with other pertinent data to the event data, such as additional information added to the network event data in the normalizer/decorator pipelines 114. The IoC engines 130 can access one or more IoC rules from the IoC rules datastore 132 and compare the normalized event data 116 against these rules. If a normalized event data 116 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 122 for processing against the more computationally intensive rules.

The rules in the IoC rules datastore 132 can include one or more rules that are easy to process (i.e. require few computational resources to run) relative to the rules run against the aggregator datastore 122. Bifurcating processing of the more computationally simple IoC rules from the more complex rules run against the aggregator datastore 122 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 132 can include a dynamic rules engine to perform comparison based on the rules stored in the IoC rules datastore 132. When the rules change, the IoC rules datastore 132 can detect the change and initiate an engine rebuild to create a second rules engine using the updated rules. While the rebuild is being performed, traffic can continue to be routed to the first, older, rules engine. Then, when the rebuild is completed, the IoC rules datastore 132 can route new traffic to the second rules engine. Once all the traffic routed to the first rules engine is acted upon, the IoC rules datastore 132 can decommission the old rules engine.

The IoC engine deposits the structured event data 120 into an IoC alert queue. The IoC alert queue can collect the received structured event data 120 for storage in the aggregator datastore 122.

Figure 2:
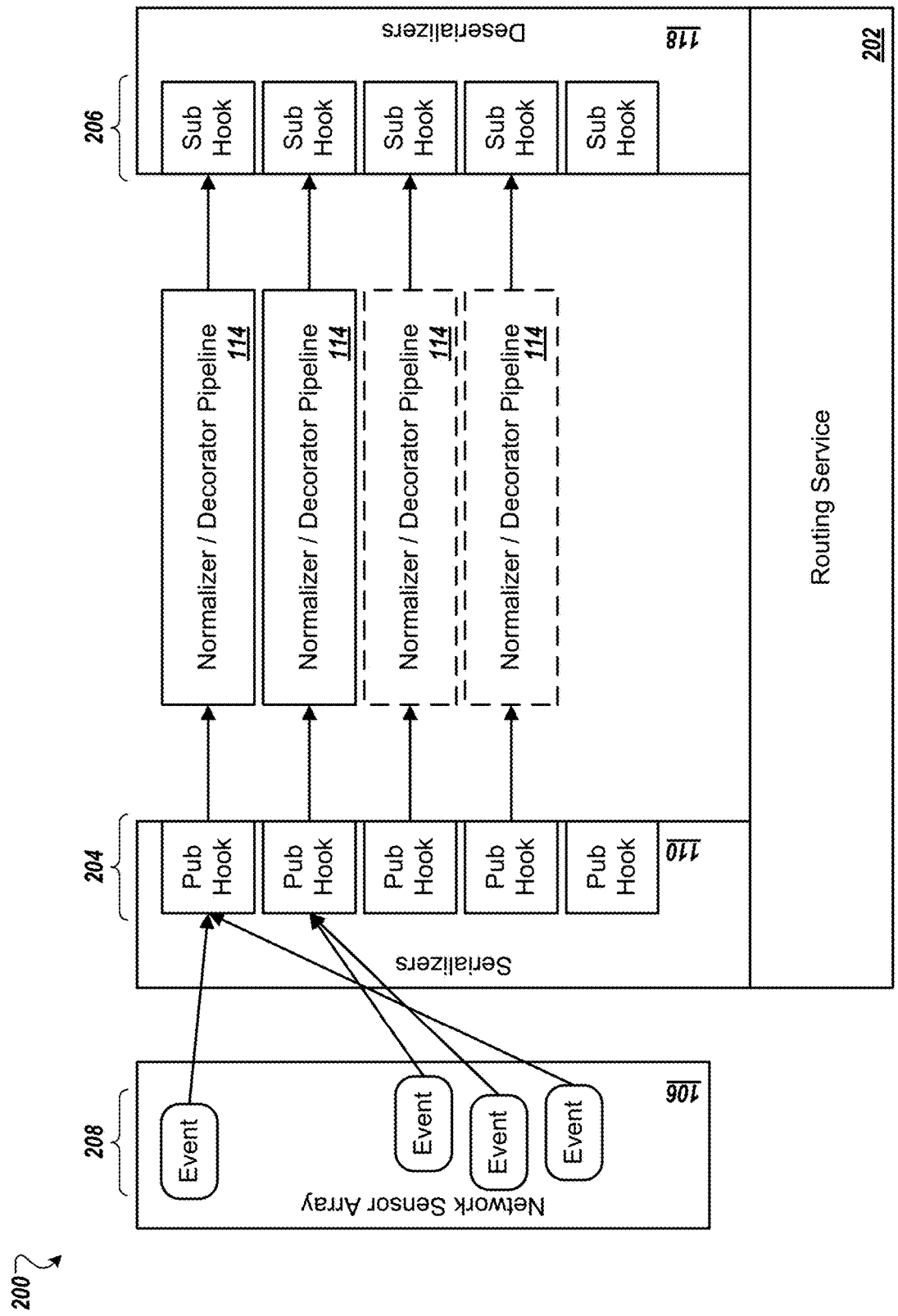
FIG. 2 is a block diagram of an example system for normalizing and decorating event data.

FIG. 2 is a block diagram of an example system 200 for normalizing and decorating event data. The system 200 shows, in greater detail, one possible configuration of some of the components of the system 100 for generation, normalization, and decoration of the event data in the system 100. However, other configurations of the elements of system 100 are possible.

In the network sensor array 106, sensors of many different types, in many different locations are positioned in the network 102. Different sensors 106 can generate events of different types. For example, a sensor 106 in an edge device such as a gateway or firewall can generate events when connections are created between resident machines 104 and machines outside of the network 102. A sensor 106 in a file-server can be configured to generate events when a resident machine 104 accesses any file, accesses a file in a restricted directory, succeeds in an authentication attempt, fails in an authentication attempt, etc.

The events can be routed to one of the initial event queues 110. As shown in this example, the initial event queues 110 and the normalized event queue 118 are both elements of or controlled by a routing service 202. The routing service can provide generalized data publication, data subscription, data queuing, and data transmission services. The routing service 202 can instantiate publication hooks 204 of the initial event queues 110 and can instantiate the subscription hooks 206 of the normalized event queue 118.

The routing service 202 can route events 208 from the network sensor array 106 to the publication hooks 204. The routing service may route the events 208 based on one or more properties of the events 208. For example, each publication hook may be associated with one or more event types. In such a case, the routing service 202 can examine each event 208 and route the event 208 to the publication hook of the associated type.

In cases when there are more events routed to a publication hook 204 than the throughput of the publication hook 204, which may be based on the speed of the normalizer/decorator pipeline 114, the routing service 202 can queue waiting events 208 and dequeue them into the publication hook 204 in order. This order may be a first-in-first-out configuration, or it could be a priority queue that dequeues the highest priority event 208 first, etc.

The routing service 202 can monitor the state of the queues to the publication hooks 204 and adjust the number of normalizer/decorator pipelines 114. For example, to avoid too much backlog, additional normalizer/decorator pipelines 114 can be created when the backlog reaches a certain size (in data size, in length of time, etc.) When the backlog falls, the routing service 202 can reduce the number of normalizer/decorator pipelines 114.

Figure 3:
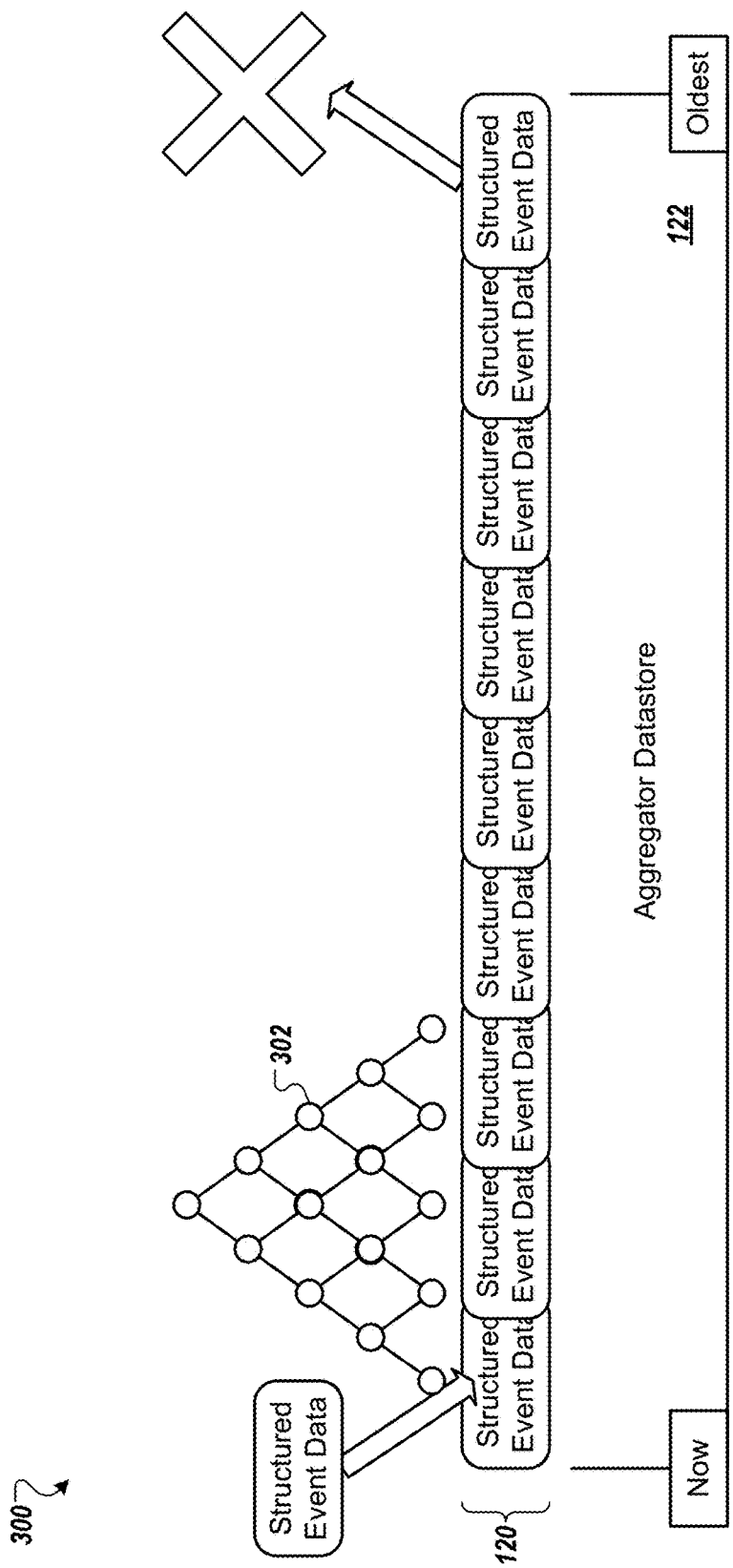
FIG. 3 is a block diagram of an example system for storage of event data.

FIG. 3 is a block diagram of an example system 300 for storage of event data. The system 300 shows, in greater detail, one possible configuration of some of the components of the system 100 for storing event data of the system 100. However, other configurations of the elements of system 100 are possible.

In the aggregator datastore 122, structured event data 120 is stored. Each structured event data 120 can include timing data such as a time that the event occurred in the network 102, a time that the structured event data 120 was finalized or stored, etc. The structured event data 120 is shown here ordered according to some time element, from newest (on the left as shown) to the oldest (as shown). Depending on the hardware configuration of the aggregator datastore 122, this ordering may or may not represent the way that the structured event data 120 is stored on disk. That is to say, the aggregator data may function as a true rolling buffer, where a circular array of memory locations are allocated for this purpose, and an index traverses the circular array when a write operation is performed.

In other configurations, the structured event data 122 is stored according to a different, and potentially more complex, scheme. This may be preferable, for example, to allow for multiple hardware instances or a distributed disk system, redundancy, improved geographic diversity, or a more flexible disk layout. In such cases, the ordered organization of the structured event data 120 is a logical view of the aggregator datastore 122.

When new structured event data 120 is added to the aggregator datastore 122, the aggregator datastore 122 can add the new structured event data 120 until the aggregator datastore 122 is full. When the aggregator datastore 122 is full, the aggregator datastore 122 can bump the oldest structured event data 120 out to make room for the new structured event data 120.

The aggregator datastore 122 can build an index 302 on recent structured event data 120. For example, the index 302 may be built on the N most recent data object, or on MMB of the most recent structured event data 120, or on all structured event data 120 less than a threshold age.

Figure 4A:
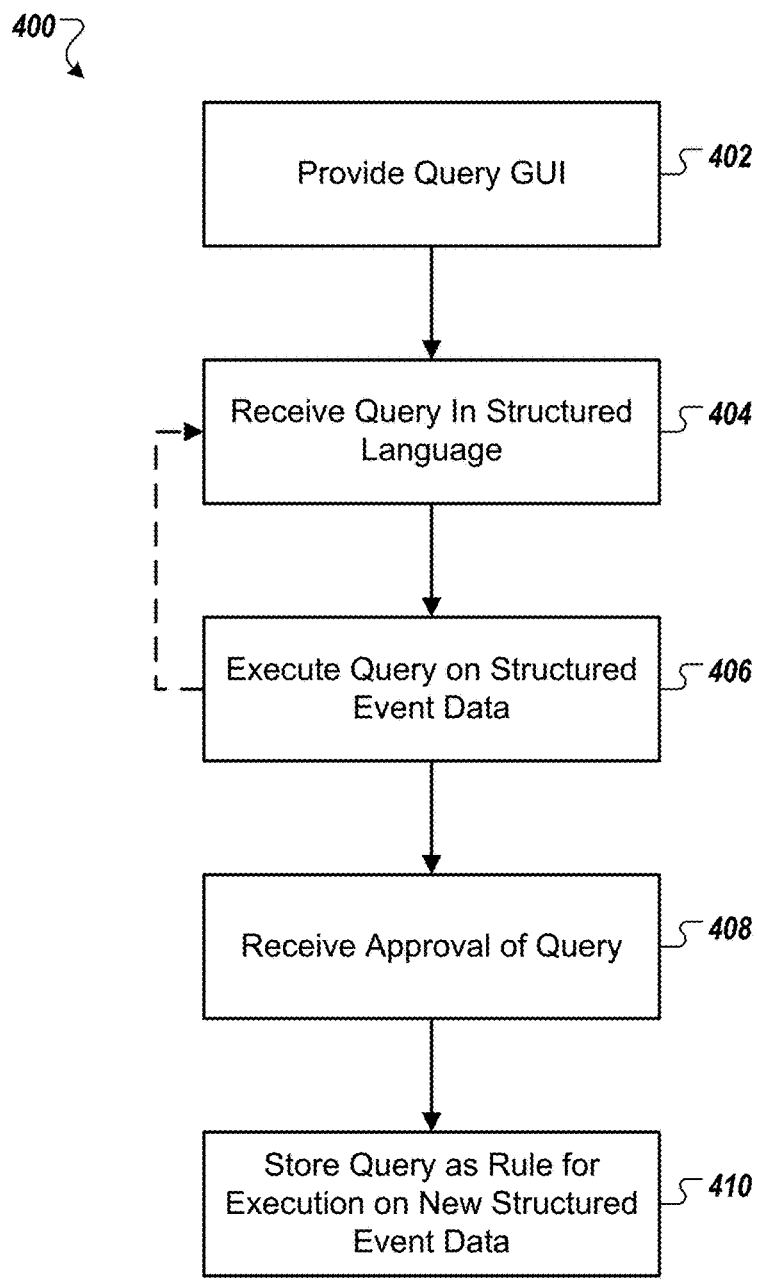
FIG. 4A is a flowchart of an example process for developing new rules.

FIG. 4A is a flowchart of an example process 400 for developing new rules. The process 400 can be performed, for example, by elements of the systems 100, 200, and 300 which will therefore be used as the basis of an example described below. However, another system or systems may be used for the process 400 or another similar process.

Figure 4B:
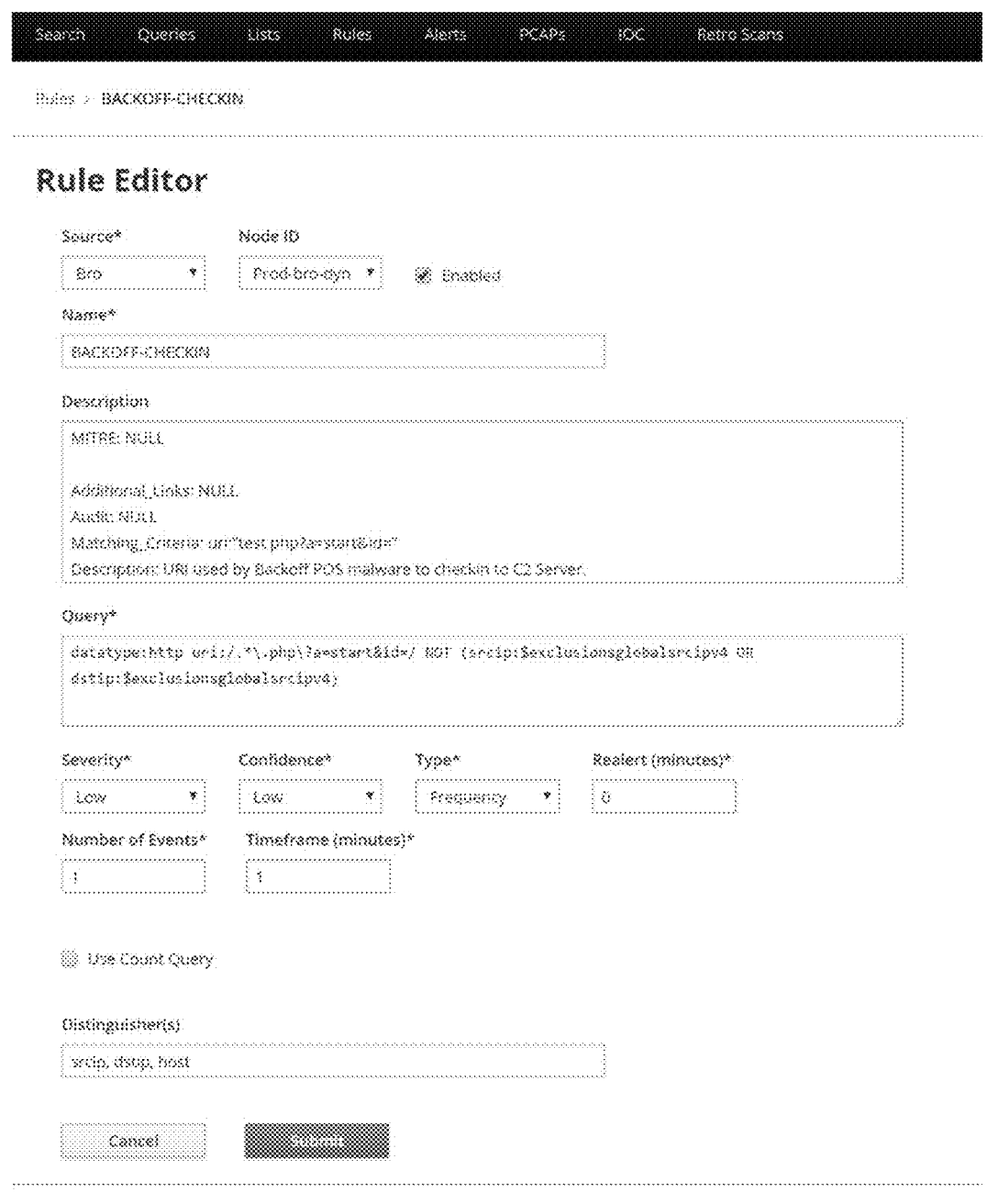

A query GUI is provided 402. For example, the security frontend 124 can generate a GUI and transmit it to a device used by the security analyst 126. An example of such a GUI is shown in FIG. 4B The GUI can include query-authoring tools to allow the user to draft, edit, or upload a query. This can include a text-field that receives text input, a file explorer, syntax-checking, etc.

A query is received in a structured language 404. For example, the security analyst 126 can author and submit a query in a structured language to the security frontend. This can include loading a saved file from disk into the GUI and uploading the file, or this could include typing on a keyboard to enter text into a text editor and the clicking of a submit button.

An example of such a query is "datatype:http host: ("urs.example.com" OR "checkappexec.example.com" OR "wdcp.example.com" OR "smartscreen.example.com" OR "smartscreen-prod.example.com") GROUPBY TERM host, STATS request_body_len"

Figure 4C:

The query is executed on structured event data 406. In response receiving the query, the security frontend 124 can execute the query on event data that is stored in the aggregator datastore 122. The results to the query can be collected and provided in the GUI for inspection by the security analyst 126. An example of such GUI is shown in FIG. 4C. Depending on the results and the goals of the security analyst 126, the query may be iteratively updated to refine the query. For example, this may be done to reduce the number of false positives in the result list, to expand the scope of the search, etc. As will be understood, the security analyst 126 can craft query to identify markers of malicious activity in the network 102. For example, a beacon program can sit on a resident machine 104 and engage in little activity, until suddenly springing into an active mode in which it engages in much network activity. When the security analyst 126 discovers such a beacon, the security analyst 126 can craft and refine a query to track down information about the beacon's network activity, refining the query based on a series of edits and new results until the security analyst 126 is satisfied with the results.

Approval for the query is received 410. For example, once the security analyst is satisfied with the query, the security analyst 126 can select a button to submit the query as a new rule. Later, this exact same query can be executed as a rule on new event data stored in the aggregator datastore 122 in order to identify new malicious activity that begins after the step 410.

These queries can be stored, for example, in a long-term datastore in the frontend 124. This storage may be of an indefinite term, such as until it is deleted by an analyst. When a rule is matched, data about the match can also be stored, so that an analyst can understand the usage of the rule. Other data stored can include list objects, user accounts, stored queries that are stored as drafts and never put into production (e.g., for testing and development, and histories of requests for particular packet-captures of network packets.

Figure 5:
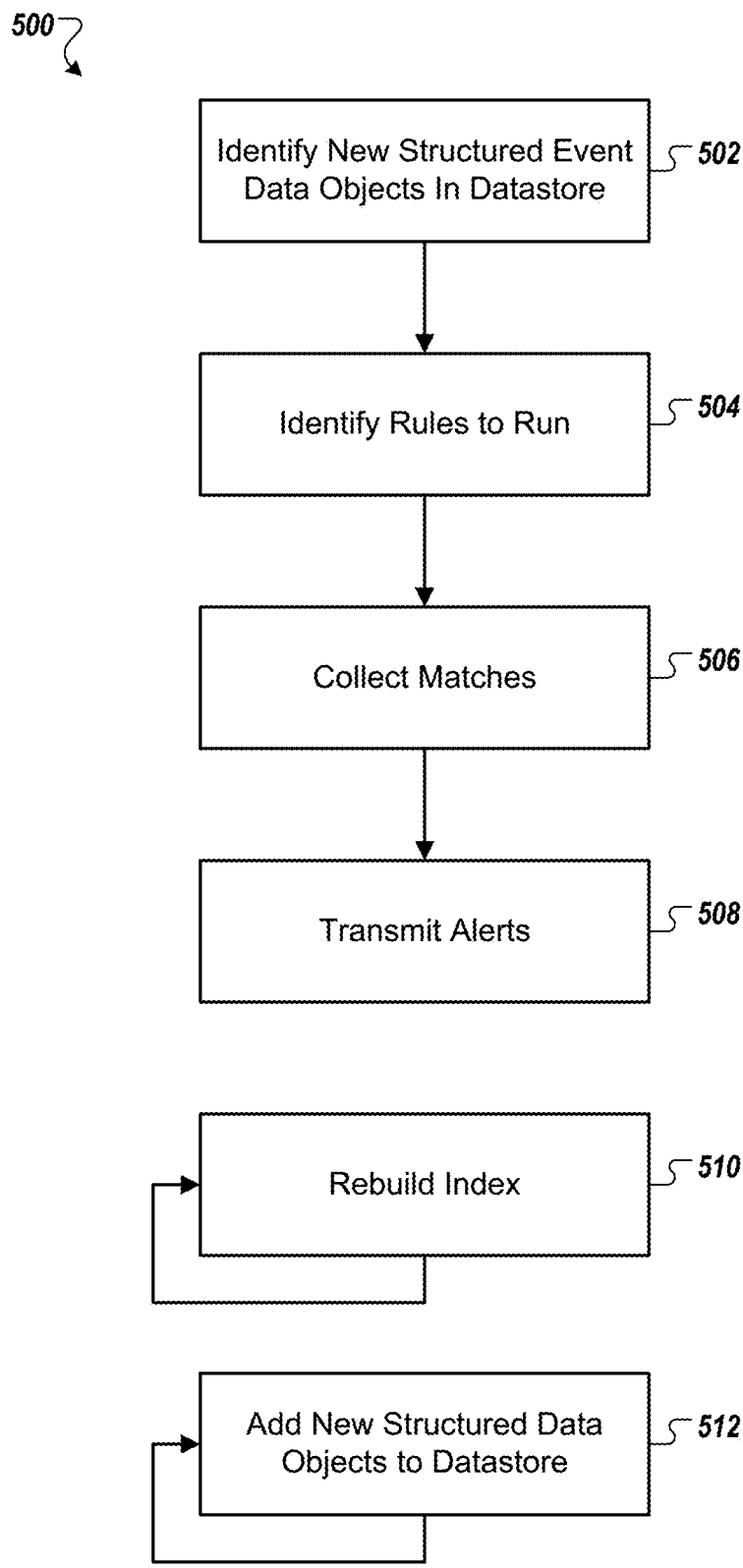
FIG. 5 is a flowchart of an example process for the regular maintenance of a search index and regular performance execution of rules using that index.

FIG. 5 is a flowchart of an example process 500 for the regular maintenance of a search index and regular performance execution of rules using that index. The process 500 can be performed, for example, by elements of the systems 100, 200, and 300 which will therefore be used as the basis of an example described below. However, another system or systems may be used for the process 400 or another similar process.

New structured event data object are identified in a datastore 502. For example, the aggregator datastore 122 can add new structured event data into the rolling buffer of event data and make that structured event data available for responding to queries, including by use of the index 302.

Rules to be run are identified 504. For example, the security frontend 124 can collect the queries that have been approved 410 or otherwise assigned to be run as rules on the structured event data 120. This can occur at regular time intervals (e.g., every minute, every second, every five minutes) on command, when computing resources are available, etc. In addition, IoC rules can be identified and included as well.

Matches are collected 506. For example, the security frontend 124 can transmit the queries to the aggregator datastore 122. Using the index 302, structured event data 120 that is a match for one or more of the queries is identified and returned back to the security frontend 124.

Alerts are transmitted 508. For example, the security frontend 124 can transmit an alert specifying the rule and corresponding result that has a match in the recent structured event data 120. This alert can take the form of an email, a text-message, a ticket in a ticketing system, or another technologically-appropriate format.

An engine to generate and transmit the alerts may be designed with parallization principals, so that that the engine is very scalable for loadbalancing. For example, a front end/user interface can start up on a regular basis (e.g., every hour) to check how long each is running to work on ingestion of network data in their queue. If at least some of the engines are running longer than a threshold amount of time, the load balancing can be performed to even the load between the engines.

An index is rebuilt 510. For example, the aggregator datastore 122 can constantly or regularly update the index 302 so that the newest structured event data 120 is indexed. In doing so, this can have the result of some of the structured event data 120 falling out of the index 302 as it ages.

New structured data object are added to the datastore 512. For example, as new structured event data 120 is received by the aggregator datastore 122, the oldest structured event data 120 may be deleted and the new structured event data 120 can be added.

Elements 510 and 512 can be performed concurrently and continuously (e.g., on a schedule, as resources are available, on command.) In this way, the contents of the aggregator datastore 122 and the index 302 can remain fresh and accurate for used by other elements of the system 100.

Figure 6:
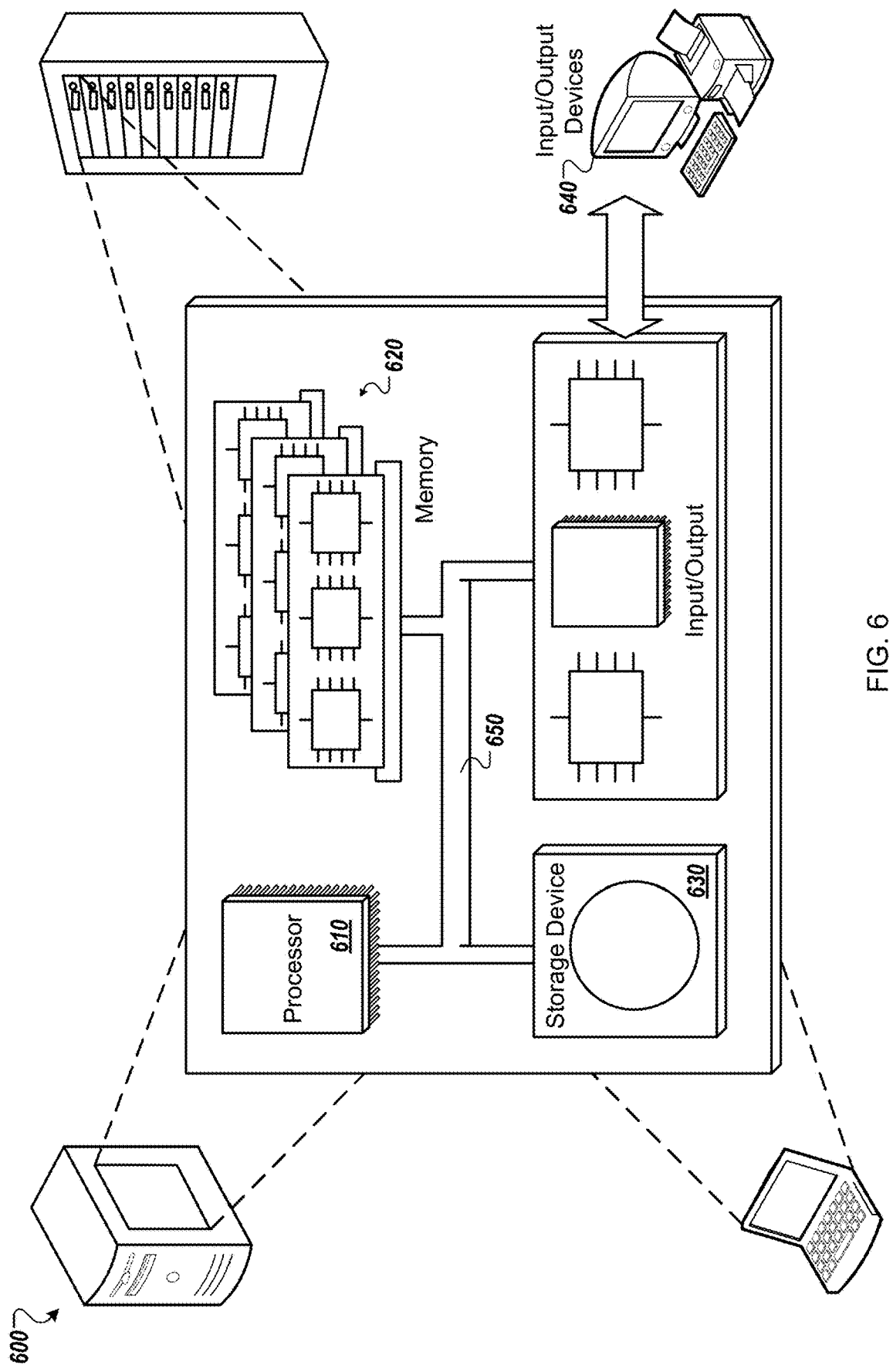
FIG. 6 is a schematic diagram that shows an example of a computing device and a mobile computing device.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A system for the generation and analysis of event data related to the operation of a data network, the system comprising:
    a plurality of network sensors configured to:
        sense the operations of the data network;
        responsive to sensing the operations of the data network, generate event data objects that record the operations of the data network;
    one or more decorator pipelines comprising one or more hardware processors and hardware memory, the one or more decorator pipelines configured to:
        decorate the event data objects with data other than from operations of the data network;
    a security frontend comprising one or more hardware processors and hardware memory, the security frontend configured to:
        generate a graphical user interface (GUI) configured to provide, to a user, query-authoring tools;
        receive a query in a structured language;
        provide, responsive to receiving the query, results to the query from historic event data that was decorated before the query was received;
        receive approval for the query; and
        later, after approval for the query is received, execute the query on new event data that has been decorated after the approval for the query is received, the later executing using a search index in an aggregator datastore so that the query is run on an index-portion of event data objects stored in the aggregator datastore, the index-portion comprising newer event data objects stored in the aggregator datastore and excluding older event data objects stored in the aggregator datastore;
    an aggregator datastore comprising one or more hardware processors and hardware memory, the aggregator datastore configured to:
        store the event data objects after the event data objects have been decorated in a rolling buffer in which old data is removed to make room for new data;
        identify the index-portion of the event data objects stored in the aggregator datastore, the index-portion comprising the newer event data and excluding the older event data objects,
        generate a search index that indexes only a predetermined amount of the newest event data stored in the aggregator datastore such that results for the query return results from the index-portion comprising the newer event data and excluding the older event data;
        generate a full index that indexes all event data objects stored in the aggregator datastore; and
        responsive to additional event data being stored in the rolling buffer, update the index-portion; and
        responsive to updating the index-portion, updating the search index without reindexing the full index.

2. The system of claim 1, wherein generation of the search index and storage of the event data objects after the event data objects have been decorated occur concurrently and continuously.

3. The system of claim 1, wherein to later execute the query on new event data that has been decorated after the approval for the query is received, the security frontend is further configured to transmit an alert specifying the result of the later execution.

4. The system of claim 1, wherein to identify the index-portion of the event data stored in the aggregator datastore, the aggregator datastore is configured to identify a particular number of the most recent data objects stored in the aggregator datastore.

5. The system of claim 1, wherein to identify the index-portion of the event data stored in the aggregator datastore, the aggregator datastore is configured to identify a particular data-volume of the most recent data objects stored in the aggregator datastore.

6. The system of claim 1, wherein to identify the index-portion of the event data stored in the aggregator datastore, the aggregator datastore is configured to identify data objects stored in the aggregator datastore less than a threshold age.

7. A non-transitory computer-readable media having instructions that, when executed by a processor, cause the processor to perform operations comprising:
    accessing a plurality of network sensors configured to:
        sense the operations of the data network;
        responsive to sensing the operations of the data network, generate event data objects that record the operations of the data network;
    generating one or more decorator pipelines configured to:
        decorate the event data objects with data other than from operations of the data network;
    generating a security frontend configured to:
        generate a graphical user interface (GUI) configured to provide, to a user, query-authoring tools;
        receiving a query in a structured language;
        providing, responsive to receiving the query, results to the query from historic event data that was decorated before the query was received;
        receiving approval for the query; and
        later, after approval for the query is received, execute the query on new event data that has been decorated after the approval for the query is received, the later executing using a search index in an aggregator datastore so that the query is run on an index-portion of event data objects stored in the aggregator datastore, the index-portion comprising newer event data objects stored in the aggregator datastore and excluding older event data objects stored in the aggregator datastore;
    generating an aggregator datastore configured to:
        store the event data objects after the event data objects have been decorated in a rolling buffer in which old data is removed to make room for new data;

identify the index-portion of the event data objects stored in the aggregator datastore, the index-portion comprising the newer event data and excluding the older event data objects, generate a search index that indexes only a predetermined amount of the newest event data stored in the aggregator datastore such that results for the query return results from the index-portion comprising the newer event data and excluding the older event data;

generate a full index that indexes all event data objects stored in the aggregator datastore; and responsive to additional event data being stored in the rolling buffer, update the index-portion; and responsive to updating the index-portion, updating the search index without reindexing the full index.

8. The computer-readable media of claim 7, wherein generation of the search index and storage of the event data objects after the event data objects have been decorated occur concurrently and continuously.

9. The computer-readable media of claim 7, wherein to later execute the query on new event data that has been decorated after the approval for the query is received, the security frontend is further configured to transmit an alert specifying the result of the later execution.

10. The computer-readable media of claim 7, wherein to identify the index-portion of the event data stored in the aggregator datastore, the aggregator datastore is configured to identify a particular number of the most recent data objects stored in the aggregator datastore.

11. The computer-readable media of claim 7, wherein to identify the index-portion of the event data stored in the aggregator datastore, the aggregator datastore is configured to identify a particular data-volume of the most recent data objects stored in the aggregator datastore.

12. The computer-readable media of claim 7, wherein to identify the index-portion of the event data stored in the aggregator datastore, the aggregator datastore is configured to identify data objects stored in the aggregator datastore less than a threshold age.

13. A method comprising:
accessing a plurality of network sensors configured to:
sense the operations of the data network;
responsive to sensing the operations of the data network, generate event data objects that record the operations of the data network;
generating one or more decorator pipelines configured to:
decorate the event data objects with data other than from operations of the data network;
generating a security frontend configured to:
generate a graphical user interface (GUI) configured to provide, to a user, query-authoring tools;
receiving a query in a structured language;
providing, responsive to receiving the query, results to the query from historic event data that was decorated before the query was received;
receiving approval for the query; and
later, after approval for the query is received, execute the query on new event data that has been decorated after the approval for the query is received, the later executing using a search index in an aggregator datastore so that the query is run on an index-portion of event data objects stored in the aggregator datastore, the index-portion comprising newer event data objects stored in the aggregator datastore and excluding older event data objects stored in the aggregator datastore;

generating an aggregator datastore configured to:
store the event data objects after the event data objects have been decorated in a rolling buffer in which old data is removed to make room for new data;
identify the index-portion of the event data objects stored in the aggregator datastore, the index-portion comprising the newer event data and excluding the older event data objects,
generate a search index that indexes only a predetermined amount of the newest event data stored in the aggregator datastore such that results for the query return results from the index-portion comprising the newer event data and excluding the older event data;
generate a full index that indexes all event data objects stored in the aggregator datastore; and
responsive to additional event data being stored in the rolling buffer, update the index-portion; and
responsive to updating the index-portion, updating the search index without reindexing the full index.

14. The method of claim 13, wherein generation of the search index and storage of the event data objects after the event data objects have been decorated occur concurrently and continuously.

15. The method of claim 13, wherein to later execute the query on new event data that has been decorated after the approval for the query is received, the security frontend is further configured to transmit an alert specifying the result of the later execution.

16. The method of claim 13, wherein to identify the index-portion of the event data stored in the aggregator datastore, the aggregator datastore is configured to identify a particular number of the most recent data objects stored in the aggregator datastore.

17. The method of claim 13, wherein to identify the index-portion of the event data stored in the aggregator datastore, the aggregator datastore is configured to identify a particular data-volume of the most recent data objects stored in the aggregator datastore.

18. The method of claim 13, wherein to identify the index-portion of the event data stored in the aggregator datastore, the aggregator datastore is configured to identify data objects stored in the aggregator datastore less than a threshold age.

* * * * *